B. R. HORNER.
SUBFLOOR TRAP AND SCREW CAP THEREFOR.
APPLICATION FILED AUG. 16, 1920.
1,403,081.
Patented Jan. 10, 1922.
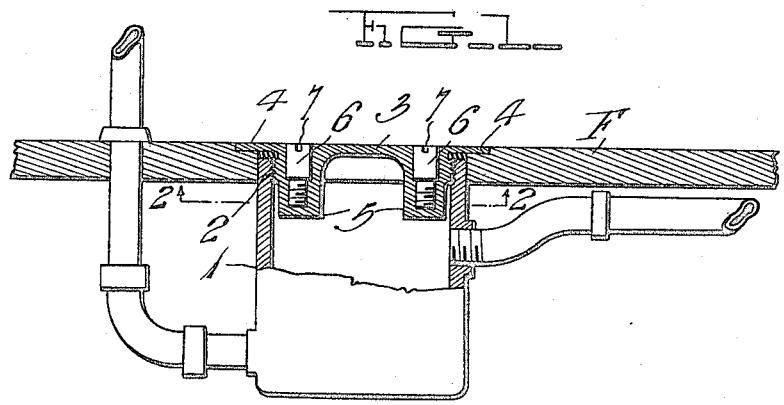
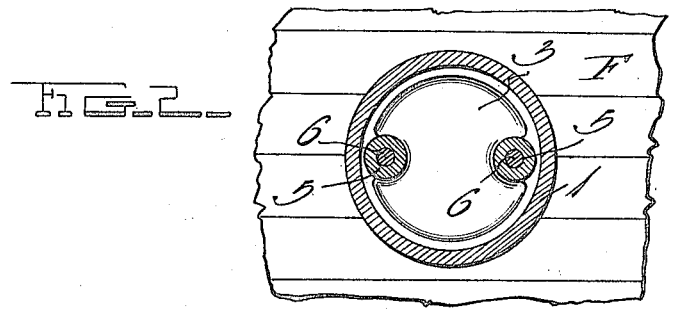
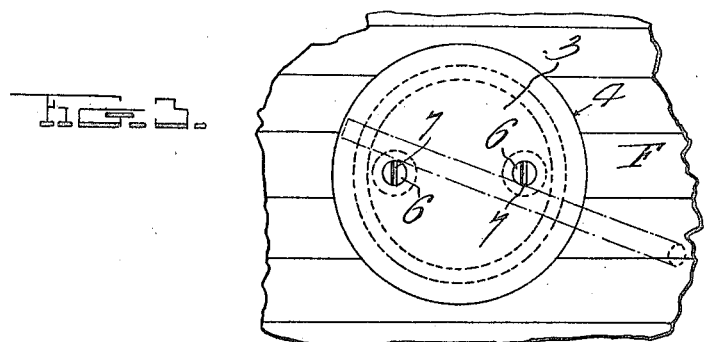
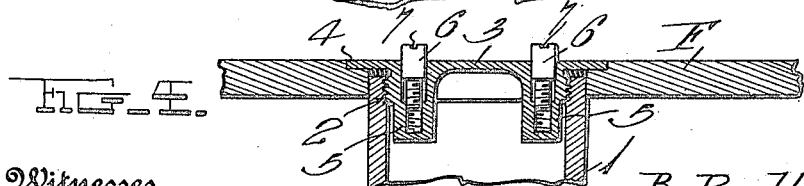
Inventor
B. R. Horner
Witnesses
H. Woodard
By
Attorneys

UNITED STATES PATENT OFFICE.

BOYD R. HORNER, OF BRIDGETON, NEW JERSEY.

SUBFLOOR TRAP AND SCREW CAP THEREFOR.

1,403,081. Specification of Letters Patent. Patented Jan. 10, 1922.

Application filed August 16, 1920. Serial No. 403,898.

*To all whom it may concern:*

Be it known that I, BOYD R. HORNER, a citizen of the United States, residing at Bridgeton, in the county of Cumberland and State of New Jersey, have invented certain new and useful Improvements in Subfloor Traps and Screw Caps Therefor; and I do declare the following to be a full, clear, and exact description of the invention, such as will enable others skilled in the art to which it appertains to make and use the same.

This invention relates to sub-floor traps and screw-caps therefor.

One object of the invention is to provide an improved screw cap or screw-threaded water-trap cover with improved means for obtaining a sufficient leverage to easily screw and unscrew the cap, said means being in the form of spanner-lugs which can be quickly and easily raised into effective position and lowered into an out-of-the-way position at the level of the floor under which the trap is located.

Another object of the invention is to provide spanner-lugs in the form of screws, the outer ends of the screws being true cylindrical and fitting in true cylindrical portions of the screw-sockets, so that the cylindrical portions, as well as the threaded portions of the spanner-lugs are always in contact with the surrounding material of the screw-cap so as to be efficiently braced for obtaining the necessary strength and rigidity while being used for screwing and unscrewing the screw-cap.

Other objects and advantages will be pointed out or implied in the following details of description, in connection with the accompanying drawings, in which:

Figure 1 is a view partly in vertical section and partly in side elevation, of a subfloor sink constructed and arranged in accordance with this invention.

Figure 2 is a horizontal sectional view along the line 2—2 of Fig. 1.

Figure 3 is a top plan view illustrating the application of a rod, bar or lever between the spanner-lugs in position to unscrew the screw-cap.

Figure 4 is a sectional view, similar to the upper portion of Fig. 1, but illustrating the spanner-lugs in their raised or effective position.

Referring to these drawings in detail, in which similar reference characters correspond with similar parts throughout the several views, and in which the floor is designated at F, the invention consists in the construction and arrangement of parts as hereinafter described and claimed.

The body of the sink is generally indicated by the numeral 1, and its upper end is disposed in an opening of the floor F, being preferably snugly fitted in said opening as indicated. The inner surface of the upper end of this body or receptacle 1 is screw-threaded, as indicated at 2, and its upper end may be provided with a suitable gasket which is in effect a part of the receptacle itself, though not essentially an integral part.

A screw-cap 3 is seated on the top of the body or receptacle 1, and has screw-threaded engagement with the threaded portion 2 of the body or receptacle. In other words, the screw-cap 3 is in the form of a disk, and a peripheral portion of this disk is screw-threaded for engagement with the threads 2. This disk is provided with a peripheral flange 4 which is relatively thin, so that if it is seated on top of the floor, its periphery will not present an obstacle over which persons would be likely to stumble. However, the floor F may be recessed, as indicated in Figs. 1 and 4, for receiving this flange 4 so that its upper or outer surface is flush with the upper surface of the floor. Moreover, the upper surface of this flange 4 is level or flush with the remaining part of the upper surface of the disk or screw-cap.

The screw-cap is provided or formed with two sockets 5 which are eccentric to the screw-threads 2 and are spaced from one another a sufficient distance to permit a bar, rod or lever of considerable cross section and length to be inserted therebetween for engagement with a pair of screws or spanner-lugs 6 which are snugly fitted in the sockets 5 respectively. The lower or inner ends of the sockets are closed and their upper ends are open, and when the lugs or screws 6 are at their innermost or lowermost positions, their upper or outer ends are level or flush with the upper or outer surface of the screw-cap 3. Only the inner end portions of the screws and sockets are in threaded engagement, their outer ends being true cylindrical, and therefore, when the screws or spanner-lugs 6 are moved outwardly by unscrewing them or partly unscrewing them, their cylindrical portions remain in contact with the cylindrical portions of the sockets 5, so that while the threads prevent longitudinal movement of the screws when they are not being turned, the cylindrical portions thereof prevent lateral or radial movement thereof, or rather, these cylindrical portions coact with the threaded portions for preventing such radial movement. It will be seen, therefore, that these spanner-lugs are as rigidly secured against lateral or radial movement as if they were integrally united with the screw-cap 3, and are as effective as such rigid spanner-lugs for tightening or loosening the screw-cap. However, these depressible or adjustable spanner-lugs have the advantage of being normally flush with the surface of the floor F or with the outer surface of the screw-cap, so that they are not in the way of persons who are walking upon the floor. Moreover, this form of depressible or adjustable spanner-lugs has obvious advantages over a depressible spanner-lug which is not provided with screw-threads and with a screw-driver engaging slot, such as indicated at 7, for the screw-threads afford a very forceful means for raising the cylindrical portions of the spanner-lugs into effective positions, and moreover, these slots 7 are easily accessible, and may quickly and easily be cleaned or ridded of dirt or other accumulated substance so as to receive an ordinary screw-driver for loosening these screws or adjusting them from their ineffective positions to their effective positions.

From the foregoing, it will be seen that although this device is very simple, it embodies the novel, very convenient and efficient structure which obtains the advantages pointed out in the foregoing, and can be manufactured at a very slight cost.

It is not intended to limit this invention to the exact details of construction and arrangement specified and illustrated, but changes may be made within the scope of the inventive ideas as implied and claimed.

I claim:

1. A screw-cap formed with sockets having open outer ends and closed inner ends, and spanner-lugs in said sockets and normally having their outer ends flush with the outer surface of said screw-cap and being movable outward so that their outer ends can be engaged by a plain bar or spanner for screwing and unscrewing the screw-cap.

2. The combination of a screw-cap formed with sockets having screw-threads therein, and two spanner-lugs having screw-threads engaged with those of said sockets, the outer ends of said spanner-lugs being normally level with the outer side of said screw-cap, said spanner-lugs being movable outward, by partly unscrewing them, to their effective position for engagement with a bar or spanner-lug for unscrewing the screw-cap.

3. The combination of a screw-cap formed with two sockets, each socket having a screw-threaded inner end, a true cylindrical outer end, and two spanner-lugs in said sockets, each of the spanner-lugs normally having its outer end flush with the outer surface of the screw-cap, the inner end of each spanner-lug having screw-threaded engagement with the threads of its socket, each of the spanner-lugs having a true-cylindrical outer end portion slidably fitted in the outer end of its socket, whereby the spanner-lugs are movable from their out-of-the-way position to their effective position and are braced in the manner specified.

4. In a screw-cap for a sub-floor trap, a circular body including an externally threaded annular portion adapted to be screwed into the trap, an annular flange having its upper surface level with the upper surface of the main part of the disk, two internally threaded sockets having closed lower ends and open upper ends and being located eccentrically of the disk at a distance from one another, and screws fitted in said sockets and having their upper ends normally level with the top of said body and being adapted to form lever-engaging abutments, when partly unscrewed, for coacting with a plain rod, bar or spanner for tightening or loosening the cap.

5. The combination with a floor having an opening therethrough, a water-trap-body having its upper part extending up into said opening and provided with an internal screw-thread, a circular trap-cover including a screw-thread which is normally engaged with that of said trap-body, said trap-cover also including an annular flange normally having its top substantially level with the top of the floor while its bottom is seated on the top of said trap-body, said trap-cover also including two cavities having closed lower ends and open upper ends, and two abutments secured in said cavities and substantially closing their upper ends while being flush with the top of said trap-cover, but being movable to such position that they project up from said top so as to be engageable with a lever for tightening or loosening the trap-cover.

In testimony whereof I have hereunto set my hand.

BOYD R. HORNER.